US008991857B2

(12) United States Patent
Jacqmarcq et al.

(10) Patent No.: US 8,991,857 B2
(45) Date of Patent: Mar. 31, 2015

(54) AIRBAG SYSTEM FOR PASSENGER PROTECTION

(71) Applicant: Autoliv Development AB, Vargarda (SE)

(72) Inventors: Thierry Jacqmarcq, Cuigy en Bray (FR); Remi Baillivet, Dampierre en Bray (FR)

(73) Assignee: Autoliv Development AB, Värgärda (SE)

( * ) Notice: Subject to any disclaimer, the term of this patent is extended or adjusted under 35 U.S.C. 154(b) by 0 days.

(21) Appl. No.: 14/179,098

(22) Filed: Feb. 12, 2014

(65) Prior Publication Data

US 2014/0232093 A1    Aug. 21, 2014

(30) Foreign Application Priority Data

Feb. 20, 2013  (DE) .......................... 10 2013 002 982

(51) Int. Cl.
*B60R 21/203* (2006.01)
*B60R 21/233* (2006.01)
*B60R 21/263* (2011.01)
*B60R 21/235* (2006.01)

(52) U.S. Cl.
CPC ............. *B60R 21/233* (2013.01); *B60R 21/263* (2013.01); *B60R 2021/23533* (2013.01); *B60R 2021/23571* (2013.01)
USPC .......................... 280/729; 280/731; 280/743.1

(58) Field of Classification Search
USPC ......... 280/729, 730.1, 731, 736, 743.1, 743.2
See application file for complete search history.

(56) References Cited

U.S. PATENT DOCUMENTS

| 5,240,283 | A  | * | 8/1993  | Kishi et al. ..................... 280/729 |
| 5,529,337 | A  | * | 6/1996  | Takeda et al. .................. 280/729 |
| 5,584,508 | A  | * | 12/1996 | Maruyama et al. ........ 280/743.1 |
| 5,931,497 | A  | * | 8/1999  | Fischer ....................... 280/743.1 |
| 6,158,765 | A  | * | 12/2000 | Sinnhuber ................... 280/728.3 |
| 6,164,696 | A  | * | 12/2000 | Ellerbrok et al. ........... 280/743.2 |
| 6,419,262 | B1 | * | 7/2002  | Fendt et al. .................... 280/729 |
| 6,773,027 | B2 | * | 8/2004  | Bohn et al. ..................... 280/729 |
| 6,971,664 | B2 | * | 12/2005 | Amamori ...................... 280/729 |
| 7,066,487 | B2 | * | 6/2006  | Sullivan et al. ............... 280/729 |
| 7,090,248 | B2 | * | 8/2006  | Jenkins et al. ............. 280/743.1 |

(Continued)

FOREIGN PATENT DOCUMENTS

DE     102006023272 A1 * 11/2007
DE     102007005042 A1 *  8/2008
DE     10 2009 021 635 A1    11/2010

*Primary Examiner* — Paul N Dickson
*Assistant Examiner* — Laura Freedman
(74) *Attorney, Agent, or Firm* — Brinks Gilson & Lione

(57) ABSTRACT

An airbag system (3) having a two-chamber airbag (4), wherein the main chamber has an impact surface (7) which the vehicle occupant can contact and a support surface (8) with the main chamber (5) supported on an interior fitting (2) of the vehicle. A secondary chamber (11) forms a support cushion for the main chamber (5), the main chamber (5) having a greater volume than the secondary chamber (11). The secondary chamber (11) is located between the support surface (8) and the interior fitting (2). The airbag (4) has an overflow protective element (24) between the main and secondary chambers (11). A first gas generator (16) inflates the main chamber (5) and a second gas generator (17) inflates the secondary chamber (11), wherein both generators (16, 17) or only the first generator (16) can be controlled for inflating the main chamber (5) as desired.

11 Claims, 3 Drawing Sheets

(56) References Cited

U.S. PATENT DOCUMENTS

| | | | |
|---|---|---|---|
| 7,210,701 B2 * | 5/2007 | Meissner et al. | 280/729 |
| 7,543,850 B2 * | 6/2009 | Bachraty et al. | 280/743.1 |
| 8,469,395 B2 * | 6/2013 | Richez et al. | 280/730.2 |
| 8,474,862 B2 * | 7/2013 | Pursche et al. | 280/730.2 |
| 8,662,527 B2 * | 3/2014 | Sato et al. | 280/729 |
| 8,702,123 B2 * | 4/2014 | Mazanek et al. | 280/730.2 |
| 8,789,847 B2 * | 7/2014 | Nagasawa et al. | 280/731 |
| 2003/0116945 A1 * | 6/2003 | Abe | 280/729 |
| 2007/0024036 A1 * | 2/2007 | Song et al. | 280/732 |
| 2007/0296186 A1 * | 12/2007 | Kwon | 280/729 |

* cited by examiner

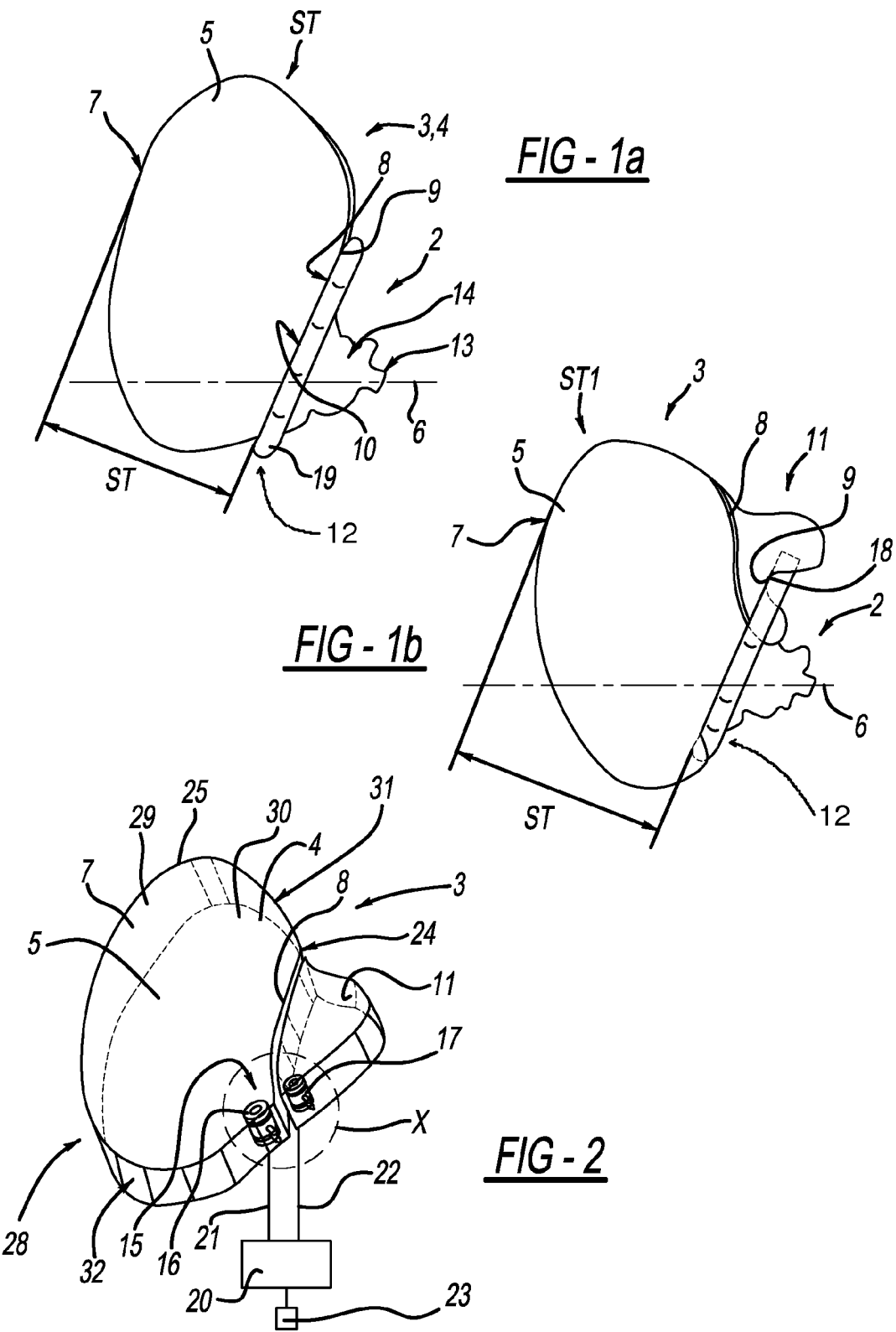

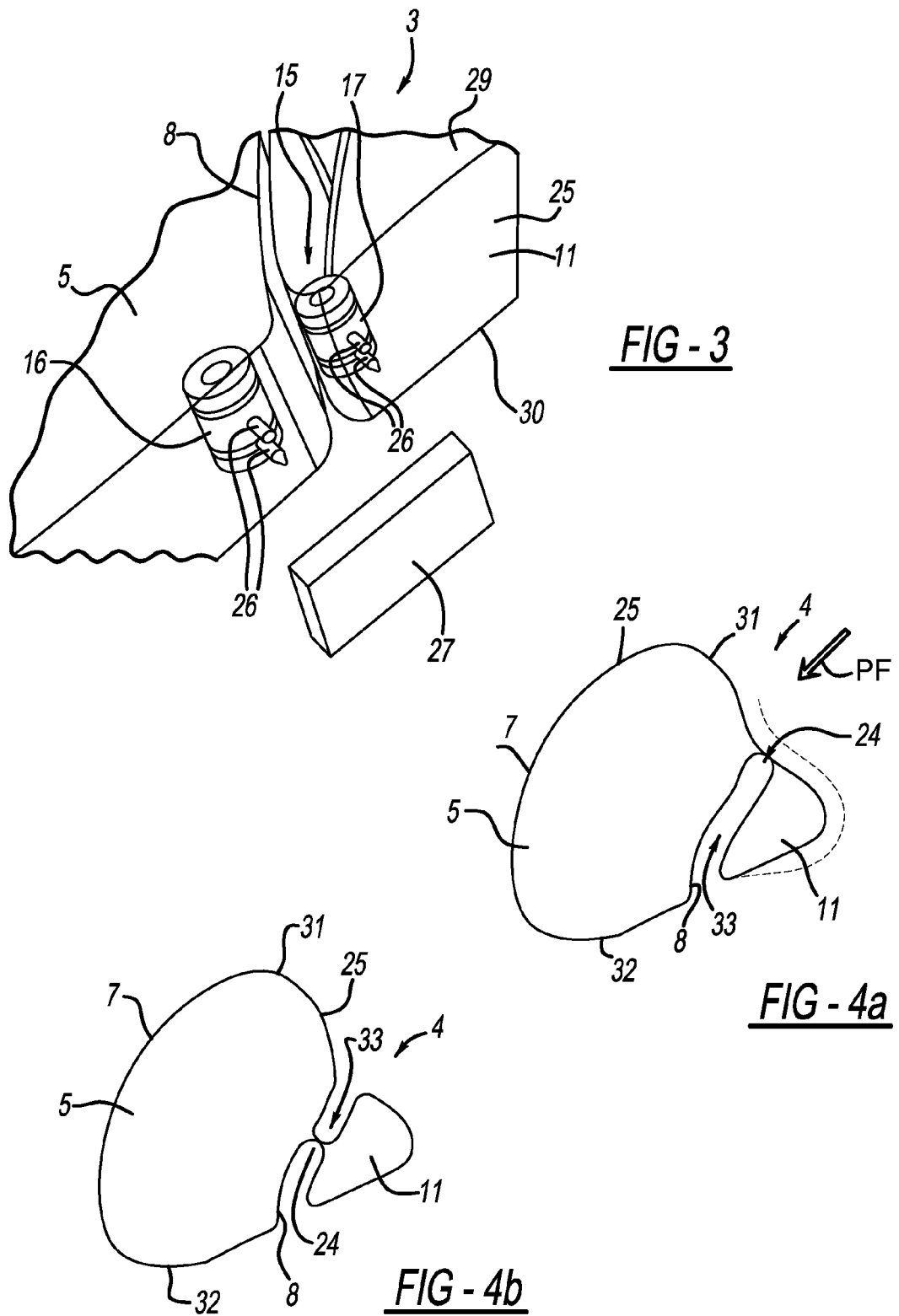

AIRBAG SYSTEM FOR PASSENGER PROTECTION

CROSS-REFERENCE TO RELATED APPLICATIONS

This application claims priority to German patent application number 10 2013 002 982.1, filed Feb. 20, 2013.

FIELD OF THE INVENTION

The invention is related to a motor vehicle airbag system for passenger protection.

BACKGROUND OF THE INVENTION

DE 10 2009 021 635 A1 shows an airbag system for passenger protection in a motor vehicle. The generic airbag system comprises an inflatable, at least two-chamber airbag with a main chamber and a secondary chamber. In the inflated condition, the main chamber forms a protective cushion for the passenger of the vehicle. The main chamber thereby has an impact surface with which the passenger of the vehicle can come in contact. Furthermore, the main chamber includes a support surface with which the main chamber can be supported on an interior fitting of the vehicle. In the known airbag system, the main chamber forms a side airbag anchored in a vehicle seat in which the support surface can support itself on a door covering adjacent thereto, when the side airbag is inflated. In inflated condition, the secondary chamber forms a support cushion for the protective cushion or the main chamber, lies between the support surface and the door covering, and forms a local enlargement of the main chamber without thereby deforming it. For the function as a protective cushion the main chamber has a significantly larger volume than the secondary chamber. In the known airbag system the main and secondary chambers are connected to each other by flow devices, so that an inflation device with a single generator fills both chambers.

The object of the invention is to provide an optimized airbag system of the type described above.

The object is achieved with an airbag system which includes the features described and claimed herein. Embodiments, further developments and/or advantageous designs are also described and claimed.

SUMMARY OF THE INVENTION

The present inventive airbag system according to is characterized in that the airbag system can be arranged on the interior fitting such that the inflatable main chamber can emerge from an outlet opening on the interior fitting on which the support surface of the main chamber can also support itself. The secondary chamber is thus configured between the support surface of the main chamber and the interior fitting. In addition, the two-chamber airbag also possesses an overflow protection element between the main chamber and the secondary chamber. Furthermore, the inflation device has a first gas generator for the main chamber and a second gas generator for the secondary chamber, wherein both gas generators or only the first gas generator can be controlled for the main chamber as desired.

An adaptive airbag system is advantageously made available such that it can react to different types of accidents or other detected parameters (passenger not wearing belt and/or passenger out of position, as it is called). For example, if an accident is identified by a sensor system for which it could be advantageous to also inflate the secondary chamber, this can occur via the second gas generator. On the other hand, for another case it suffices to only fill the main chamber via the first gas generator. If the secondary chamber is activated, it inflates between the support surface of the main chamber and the interior fitting, whereupon, on the one hand, the location or position of the main chamber with respect to the interior fitting or the passenger changes and, on the other hand, a local enlargement of the main chamber is achieved. An enlarged protective depth of the airbag is thereby attained. It is also advantageous that the airbag can be produced with the inventive overflow protection element in a simple and cost-effective manner. Basically the main and secondary chambers can be inflated simultaneously or with a time offset.

It is provided in a preferred embodiment according to invention that each gas generator of the inflation device is positioned inside the associated chamber. This achieves short flow paths to fill the chambers and as well as a compact arrangement of the airbag system.

A further development of the invention are features providing for configuring the shell wall of the airbag in one piece made from one or several cuts and the overflow protection element by a substantially airtight connection of opposite sections of the shell wall. The inventive overflow protection element can be realized in a simple manner after the manufacture of the shell wall, namely the airbag, by a linear connection of the sections of the shell wall by adhesion and/or stitching and/or welding. The one-piece airbag can thus be produced cost effectively.

Especially preferred is another embodiment according to which the airbag has in addition to the impact surface and the support surface two other side surfaces opposite each other at a distance as well as a top surface and a bottom surface, wherein the linear airtight connection runs parallel to the top or bottom surface or parallel to a least one of the side surfaces. Different geometries of the airbag can be realized in an advantageous manner by the choice of the location or position of the connection. The number of different geometries of the airbag can be increased according to embodiments of the present invention.

The features described and/or shown in this application can be combined alone or in any desired combination with another of the described and/or shown features. That also applies to a feature which is depicted combined only with another described and/or shown feature.

BRIEF DESCRIPTION OF THE DRAWINGS

The invention will be described in more detail in the following using embodiments with reference to the drawing. Wherein:

FIGS. 1a and 1b show an inventive adaptive airbag system in accordance with the present invention, FIG. 2 is a perspective view of the inventive airbag system with an inflation device, FIG. 3 is an enlarged depiction of detail X from FIG. 2, FIGS. 4a to 4c show an embodiment of an inventive airbag system.

DETAILED DESCRIPTION OF THE INVENTION

Figure 4C:
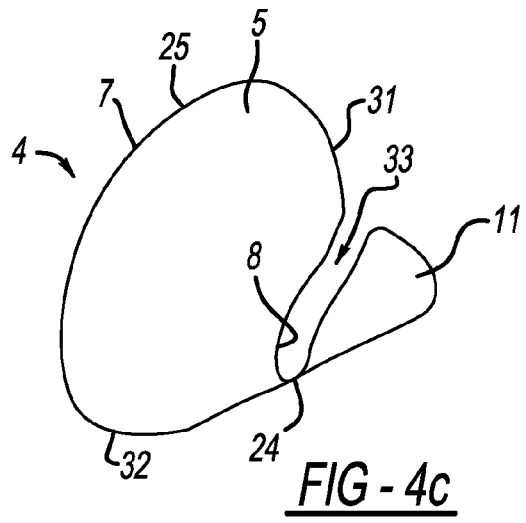
FIG. 4d is an overhead view of the airbag system according to FIG. 4a, and FIGS. 5a to 5c illustrate another embodiment of the inventive airbag systems.

FIG. 1a shows an interior fitting 2 in a vehicle interior space of a motor vehicle with an airbag system 3 attached thereto, which features an inflatable airbag 4 with an inflatable main chamber 5 which forms a protective cushion for a motor vehicle passenger not depicted here. A dashed line 6 lies parallel to the vehicle longitudinal axis. The main chamber 5 is shown in FIG. 1 in an inflated protective position SP in which a larger section of the main chamber lies above line 6. The section of the main chamber 5 lying below line 6 is clearly smaller than the upper section. The ratio of lower section to upper section can amount to about ¼ to ⅓ for the lower section and accordingly ⅔ to ¾ for the upper section.

The main chamber 5 has an impact surface 7 lying in the direction of a non-depicted passenger with which the passenger can come in contact in the event of an accident, when the main chamber 5 assumes the protective position SP. The main chamber 5 also has a support surface 8 positioned to face the interior fitting 2 with which the main chamber 5 supports itself resting on the interior fitting 2. Accordingly the interior fitting 2 exhibits a contact area 9 for the support surface 8. Located in the plane of the contact area 9 or with a slight separation to it there is an exit opening 10 from which the airbag 4 emerges from the interior fitting 2, when it is expanded from a not depicted, rolled and/or folded pack position out of a retainer into the protective position SP. In the protective position SP the main chamber 5 is located between the interior fitting 2 and the not depicted passenger of the vehicle.

FIG. 1b shows the airbag system 3 in an adaptive condition in which the main chamber 5 assumes a modified protective position SP1 in which the main chamber 5 swivels downward around an imaginary swivel axis which runs at a right angle to the plane of the drawing, so that the section of the main chamber 5 lying below line 6 is enlarged compared to the protective position SP of FIG. 1a and the upper section is accordingly reduced. Furthermore, the protective depth ST of the airbag 5 measured in the vehicle longitudinal direction is enlarged in the protective position SP1, as the comparison of FIG. 1a and FIG. 1b shows.

The modified protective position SP1 for the main chamber 5 is achieved by an inflatable secondary chamber 11 of the airbag 4 which is inflated between the contact area 9 of the interior fitting 2 and the support surface 8 of the main chamber 5. The secondary chamber 11 thus forms a support cushion for the main chamber 5, in order to enlarge it locally and also to move the imaginary swivel axis into the protective position SP1. The main chamber 5 possesses a significantly larger volume than the secondary chamber 11.

As can be seen in FIGS. 1a and 1b, the interior fitting 2 in this embodiment is configured as a steering wheel 12 with a steering wheel hub 13 and a so-called impact absorber 14, wherein the impact absorber 14 can have a receptacle and accordingly receive the airbag 4 in the non-depicted packed-position. The line 6 is sketched through the steering wheel hub 13 vehicle longitudinal axis (direction of movement) to define its position.

The adaptive airbag system 3 shown in FIG. 2 includes in addition to the airbag 4 an inflation device 15 with a first gas generator 16 for the main chamber 5 and a second gas generator 17 for the secondary chamber 11. As can be seen in the side view of FIGS. 1a and 1b and the perspective according to FIG. 2, the main chamber 5 possesses an oval cross-section, while the secondary chamber 11 has an approximately triangular cross-section and its long side lies opposite the support surface 8, when both chambers 5 and 11 assume the protective position SP1. In FIG. 1b the secondary chamber 11 is deformed by the interior fitting 2, since the secondary chamber 11 supports itself with its support surface 18 on the contact area 9, here on the steering wheel. The contact area 9 is significantly smaller in the embodiment shown than the support surface 18, so that the secondary chamber 11 following the course of the steering wheel rim 19 is linearly deformed, but still moves the main chamber into the protective position SP1.

It is clear from the above that the airbag system 3 is not limited to use on steering wheels but also may be used on other interior fittings, such as an instrument panel, the door interior paneling or a roof longitudinal spar or the like, which might have a level or continuous contact area 9. The described airbag system 3 is not limited to use as a driver airbag but can also be used as the passenger airbag or side airbag, although this is not shown.

As FIG. 2 also shows, both gas generators 16 and 17 are arranged close to each other in the airbag 4. Thus for example the second gas generator 17 is positioned in a lower corner of the secondary chamber 11, while the first gas generator 16 is placed in the lower third of the main chamber 5. Both gas generators 16 and 17 can be controlled by a control device 20 via corresponding control lines 21 and 22 such that only the first generator 16 can be activated as desired for the main chamber 5 or both gas generators 16 and 17 for the main chamber 5 and the secondary chamber 11, depending on which type of accident or which other parameters are detected by the control device 20 via a sensor or a sensor system 23.

FIG. 2 shows overflow protection element 24 which separates the main chamber 5 and the secondary chamber 11 from each other by flow mechanisms or represents a basically airtight connection of two sections of the shell wall 25 of the airbag 4, as is described in more detail in the following using FIGS. 4 and 5. Generators 16 and 17 of the inflation device 15 each possess at least one fastening bolt 26 which penetrates the shell wall 25 and is connected with a carrier or fastening device 27 of the airbag system 3, which is only schematically implied here. The airbag system 3 can be secured to the interior fitting 2 via the fastening device 27.

The airbag 4 can be manufactured with its main chamber 5 and its secondary chamber 11 as a single piece with one or several cuts 28. As mentioned, it has at least the outer shell wall 25 which has the impact surface 7, the support surface 8, as well as two opposite side surfaces 29 and 30 positioned at a distance to each other. In addition the shell wall 25 also defines a top surface 31 as well as a bottom surface 32. By definition the top surface 31 lies between the impact surface 7 and the support surface 8. The same is true for the bottom surface 32.

As FIG. 4a shows, the protective depth ST (FIG. 1) of the airbag 4 can be changed by varying of size of the inflatable secondary chamber 11, as is shown with a dashed line in FIG. 4a. An accordingly designed enlargement of the secondary chamber 11 increases the protective depth ST. With reference to FIG. 4 and FIG. 5, the various embodiments below show how the connection or the overflow protective element 24 can be arranged and produced. Basically the embodiments of FIG. 4 and FIG. 5 differ in that the sections of the shell wall 25 can be connected parallel to the top or bottom surface 31, 32, as shown in FIG. 4, or parallel to one or both side surfaces 29, 30, as the embodiments of FIG. 5 show.

Figure 4D:
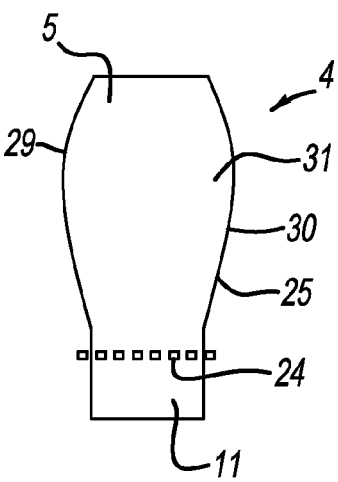

According to FIGS. 4a to 4c, which show a side view of the airbag 4, the top and bottom surfaces 31, 32 are connected with each other linearly so that in each case a constriction 33 is produced. The top and bottom surfaces 31, 32 touch each other linearly (see FIG. 4d, which shows an overhead view in the direction of the arrow PF in FIG. 4a). For example, the sections of the shell wall 25 are connected with each other by adhesion and/or a stitch and/or a weld. The connection thereby extends from the one side surface 29 to the other side surface 30. Thus in the embodiment according to FIG. 4a, the connection or the overflow protection element 24 lies in the top surface 31, while on the other hand in the embodiment of FIG. 4b the connection or the overflow protection element 24 lies approximately centered between the top surface 31 and the bottom surface 32. In the embodiment of FIG. 4c the connection or the overflow protection element 24 lies within the bottom surface 32. It is clear that the overflow protection element 24 can also lie at any desired position between the top and bottom surface 31, 32 by means of an appropriately designed constriction 33.

Figure 5A:
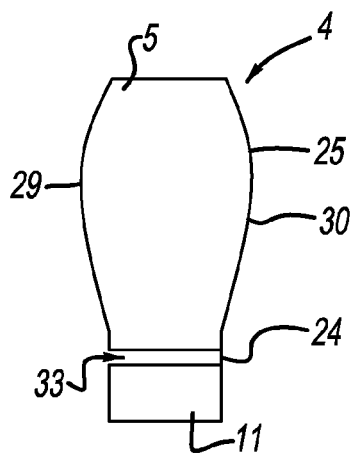
Figure 5B:
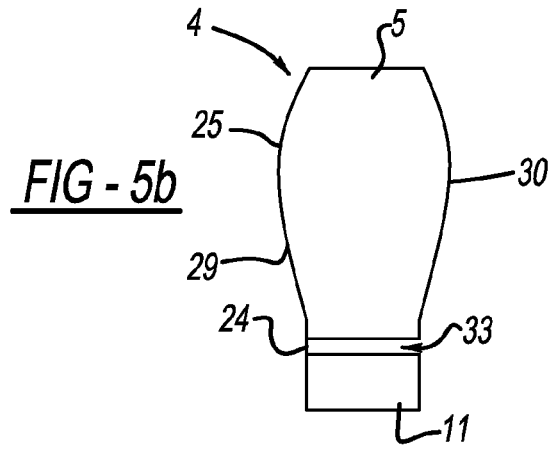
Figure 5C:
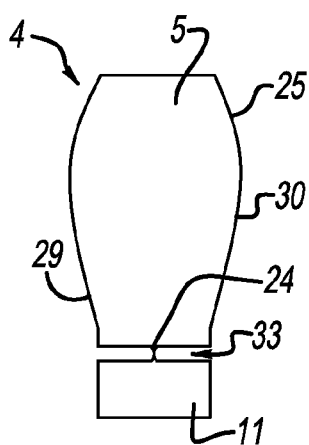

According to the embodiments of FIGS. 5a to 5c, which show an overhead view of the airbag 4, the linear connection or the overflow protection element 24 runs parallel to the side surfaces 29, 30 wherein in each case a constriction 33 is produced, so that the side surfaces 29, 30 touch each other linearly and are connected to each other by adhesion and/or a stitch and/or a weld of the shell wall 25. The connection thereby runs from the top surface 31 to the bottom surface 32. In the embodiment according to FIG. 5a, the connection or the overflow protection element 24 lies in the side wall 30, while on the other hand according to the example in FIG. 5b the connection or the overflow protection element 24 lies in the side surface 29 and according to the embodiment in FIG. 5c, the overflow protection element 24 lies between the two side walls 29, 30. It is clear that the overflow protection element 24 can also lie in these embodiments at any desired position between the side surfaces 29, 30 by means of an appropriately designed constriction 33.

In production of the airbag system 3, the airbag 4 is designed in a single piece by means of one or several cuts, wherein in the case of several cuts they can be connected to each other in the customary way. Through at least one opening present (not depicted) in the airbag 4, the generators 16, 17 can be inserted in the main and secondary chambers 5, 11 and their bolts 26 can be inserted through the openings made in the shell wall 25. Then the constriction 33 is produced and the linear connection for the overflow protective element 24, namely the linear connection of the sections (top and bottom surfaces 31, 32 or the side walls 29, 30) of the shell wall 25, is completed by means of adhesion and/or stitching and/or welding. It would be conceivable to produce the constriction 33 and the connection for the overflow protective element 24 before the generators 16, 17 are inserted into the particular chambers 5 and 11.

The constriction 33 can be designed as an actual constriction. Alternatively the constriction 33 can be realized by appropriately designed, various cuts for the shell wall 25; thus the support surface 8 in FIG. 4a can extend from the bottom surface 32, or as FIG. 4b shows. From the top surface 31, or as can be seen in FIG. 4c from both surfaces 31, 32. That also applies to the embodiments of FIG. 5. The support surface 8 can be designed as a continuation of side surface 29 and/or 30.

Finally, the airbag 4 so assembled can be connected with a carrier or fastening device 27 so that it is prepared as a preassembled airbag system 3 for installation in a motor vehicle.

While the above description constitutes the preferred embodiment of the present invention, it will be appreciated that the invention is susceptible to modification, variation and change without departing from the proper scope and fair meaning of the accompanying claims.

The invention claimed is:

1. An airbag system for protection of an occupant of a motor vehicle, comprising an inflatable airbag with a main chamber forming a protective cushion for the occupant, whereby the main chamber has an impact surface with which the occupant can come in contact, and the main chamber having a support surface with which the main chamber can be supported on an interior equipment device of the motor vehicle, and further comprising a secondary chamber forming a support cushion for the main chamber, whereby the main chamber has a greater volume than that of the secondary chamber, and an inflation device for the airbag, the airbag system adapted to be arranged on the interior equipment device in such a manner that the main chamber can exit from an exit opening on the interior equipment device, on which the support surface of the main chamber can also be supported, the secondary chamber is formed between the support surface and the interior equipment device, and the inflation device includes a first gas generator for the main chamber and a second gas generator for the secondary chamber, whereby both of the first and second gas generators or only the first gas generator can be selectively controlled for inflating the main chamber, wherein the inflatable airbag, when installed within the motor vehicle defining a horizontal line generally parallel to a longitudinal axis of the motor vehicle and passing through the interior equipment device of the motor vehicle, the main chamber having a first lower portion thereof below the horizontal line when only the main chamber is inflated by the first gas generator, and having a second lower portion, larger in volume than the first lower portion below the horizontal line when the main chamber and the secondary chamber are respectively inflated by the first and the second gas generators.

2. The airbag system according to claim 1, further comprising that each of the first and the second gas generators is arranged inside the associated main chamber and the secondary chamber.

3. The airbag system according to claim 1 further comprising that the inflatable airbag, upon inflation by one or both of the first and the second gas generators swiveling about an axis generally parallel to the line, and the airbag swiveling through a greater angle upon inflation by the first and the second gas generators than when inflated only by the first gas generator.

4. The airbag system according to claim 1 further comprising the airbag defining a first protective depth measured as a distance between the impact surface and the interior equipment device upon inflation of the main chamber and the secondary chamber by the respective first and second gas generators, and having a second protective depth measured as a distance between the impact surface and the interior equipment device upon inflation of only the main chamber by the first gas generator, and wherein the first protective depth is greater than the second protective depth.

5. The airbag system according to claim 1 further comprising that the airbag has an overflow protection element between the main chamber and the secondary chamber.

6. The airbag system according to claim 5 further comprising that a jacket wall of the airbag is constructed in one part from one or several blanks and the overflow protection element is formed by sections of the jacket wall opposite a substantially tight connection.

7. The airbag system according to claim 6 further comprising that the connection is designed in a linear manner.

8. The airbag system according to claim 7 further comprising that the airbag further comprises two side surfaces located opposite one another and at a distance from one another and cooperate to form a top surface and a bottom surface, whereby the linear connection runs parallel to the top surface or the bottom surface or parallel to at least one of the side surfaces.

9. The airbag system according to claim 8 further comprising that the connection is located in one of the side surfaces or between the side surfaces.

10. The airbag system according to claim 8 further comprising that the connection is located in the top surface or the bottom surface or between the top and the bottom surfaces.

11. The airbag system according to claim 6 further comprising that the connection is formed by one or more of a linear adhesion, a seam, and a welding.

* * * * *